(12) United States Patent
Pettinati

(10) Patent No.: US 7,836,407 B2
(45) Date of Patent: Nov. 16, 2010

(54) SMART FIELDS

(75) Inventor: Lucas Visvikis Pettinati, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 574 days.

(21) Appl. No.: 11/799,567

(22) Filed: May 2, 2007

(65) Prior Publication Data
US 2008/0276193 A1    Nov. 6, 2008

(51) Int. Cl.
*G06F 17/10*   (2006.01)
*G06F 3/02*    (2006.01)
*G06F 3/048*   (2006.01)
(52) U.S. Cl. ................. 715/780; 715/224; 715/703
(58) Field of Classification Search ........... 715/780, 715/226, 224, 703
See application file for complete search history.

(56) References Cited

U.S. PATENT DOCUMENTS

2002/0156846 A1 * 10/2002 Rawat et al. ............. 709/203
2008/0183780 A1 *  7/2008 Amabile et al. .......... 708/100

* cited by examiner

*Primary Examiner*—Namitha Pillai
(74) *Attorney, Agent, or Firm*—Martine Penilla & Gencarella, LLP

(57) ABSTRACT

Systems and methods are provided for smart interfaces that shift the burden of cognition from a user or data input source to the computer system controlling the software or user interfaces requiring data input. More particularly, according to embodiments of present invention, by using information known about a user or the user's preferences, a user's geographic location, and/or the geographic location of the site or product being used etc., rules about how to interpret data inputs can be applied to data entries so that the data entries are redisplayed or processed in a normalized format.

6 Claims, 8 Drawing Sheets

SMART FIELDS

BACKGROUND

1. Field of the Invention

The invention relates generally to providing a smart user interface and, more particularly, to providing smart data entry fields that can interpret information provided to software or online interfaces in a format that is not commonly understood by a computer system controlling the software or online interfaces.

2. Description of the Related Art

Conventionally, information provided to software or online interfaces must be provided in a specific format that is recognized by the tools associated with the software or online interface. In particular, computer users are often forced to alter their natural way of thinking in order to provide information in a format that can be understood by the tool they are using. This phenomenon is easily observed when one provides a date, a credit card number, or a telephone number as part of a data entry process. For example, a date may be provided in a varied number of formats including "3-31-92" "03/31/1992," and "03311992" which can then be interpreted as "March 31, 1992" or "31 Mar. 1992." These varied formats can cause severe problems for conventional data entry applications, even those data entry applications that perform some level of data entry interpretation. For example, using the Apple Computer™ Address Book application, a birthday entry of "4767" yields an output of the current month and day with a year of "4767."

Similar problems as those found with date information can also be observed with telephone numbers. For example, with Apple Computer's Address Book application telephone numbers are incorrectly assumed to be in the same locale as the user's system. In particular, an entry of "551112345678," "+551112345678," or the like is not reformatted according to a geographic location associated with the telephone number. In another example, the telephone number "408-555-1212" can be easily interpreted by a human as the same as "(404) 555-1212" or "+1 (408) 555-1212." Yet, computer users are required to provide such data in a specific format in a single data entry field, or the users are required to split the data amongst multiple discreet data entry fields. Moreover, other types of data such as credit card numbers, universal product code (UPC) numbers, international standard book numbers (ISBN), and social security numbers etc. are similarly affected since these numbers can be input and/or read as a single uninterrupted strings or as having delimiters (e.g. spaces, hyphens, etc.) between portions of the data entry string. To avoid such problems, programmers and designers have resorted to providing discreet data entry fields (e.g. month, day and year) in an effort to solve data sequencing issues (e.g. month-day-year vs. year-month-day) and imposing restrictions on what the value of each discreet data field must be.

In view of the forgoing, there is a need to provide a smart interface that shifts the burden of cognition from a user or user equivalent to the computer system controlling the software or user interfaces requiring data input.

SUMMARY

In one embodiment, the present invention provides a method for using a computer system to interpret data, the computer system including a display screen, where the computer system controls a user interface presented to the display screen. The method comprises accepting the data from a data entry field of the user interface, where the data is provided to the data entry field in a selected format, and where the selected format is different from a common data format expected or recognized by the user interface. The method also comprises normalizing the data to conform to the common data format expected or recognized by the user interface. The method further comprises providing the data in the common data format.

In another embodiment, the present invention provides a computer-readable medium for directing a computer system to interpret data, the computer system including a display screen, where the computer system controls a user interface presented to the display screen. The computer-readable media comprises instructions for accepting the data from a data entry field of the user interface, where the data is provided to the data entry field in a selected format, and where the selected format is different from a common data format expected by the user interface. The computer-readable media also comprises instructions for normalizing the data to conform to the common data format expected or recognized by the user interface and instructions for providing the data in the common data format.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION

Embodiments of the present invention provide systems and methods for providing smart interfaces that shift the burden of cognition from a user or data input source to the computer system controlling the software or user interfaces requiring data input. More particularly, according to embodiments of present invention, by using information known about a user or the user's preferences, a user's geographic location, and/or the geographic location of the site or product being used etc., rules about how to interpret data inputs can be applied to data entries so that the data entries are redisplayed or processed in a normalized format. In one embodiment of the present invention, such data normalization is performed by identifying the type of data expected from a data entry field, breaking down the data into a rudimentary or raw form, validating the rudimentary data form against rules for the data type, and applying formatting rules to the validated rudimentary form to redisplay or process the data entry in a commonly recognized format.

In other words, embodiments of the present invention allow a user or any other data input source to provide a computer system with data in any one of many arbitrary formats, thereby shifting the burden of cognition from the user or data input source to the computer system receiving the data input. The system in turn interprets the data input and redisplays or processes the data in a common format. In one embodiment of the present invention, if the system determines that there are multiple valid interpretations of the data input, the system may choose a prevailing interpretation without intervention from the user or data input source, or the system may ask the user or data input source to clarify the data input. In one embodiment of the present invention, if the system is unable to understand the original data input, the system can display or process the input data in the exact format that the input data was entered or the system can yield an error condition.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. The present invention includes several aspects and is presented below and discussed in connection with the Figures and embodiments.

Figure 1:
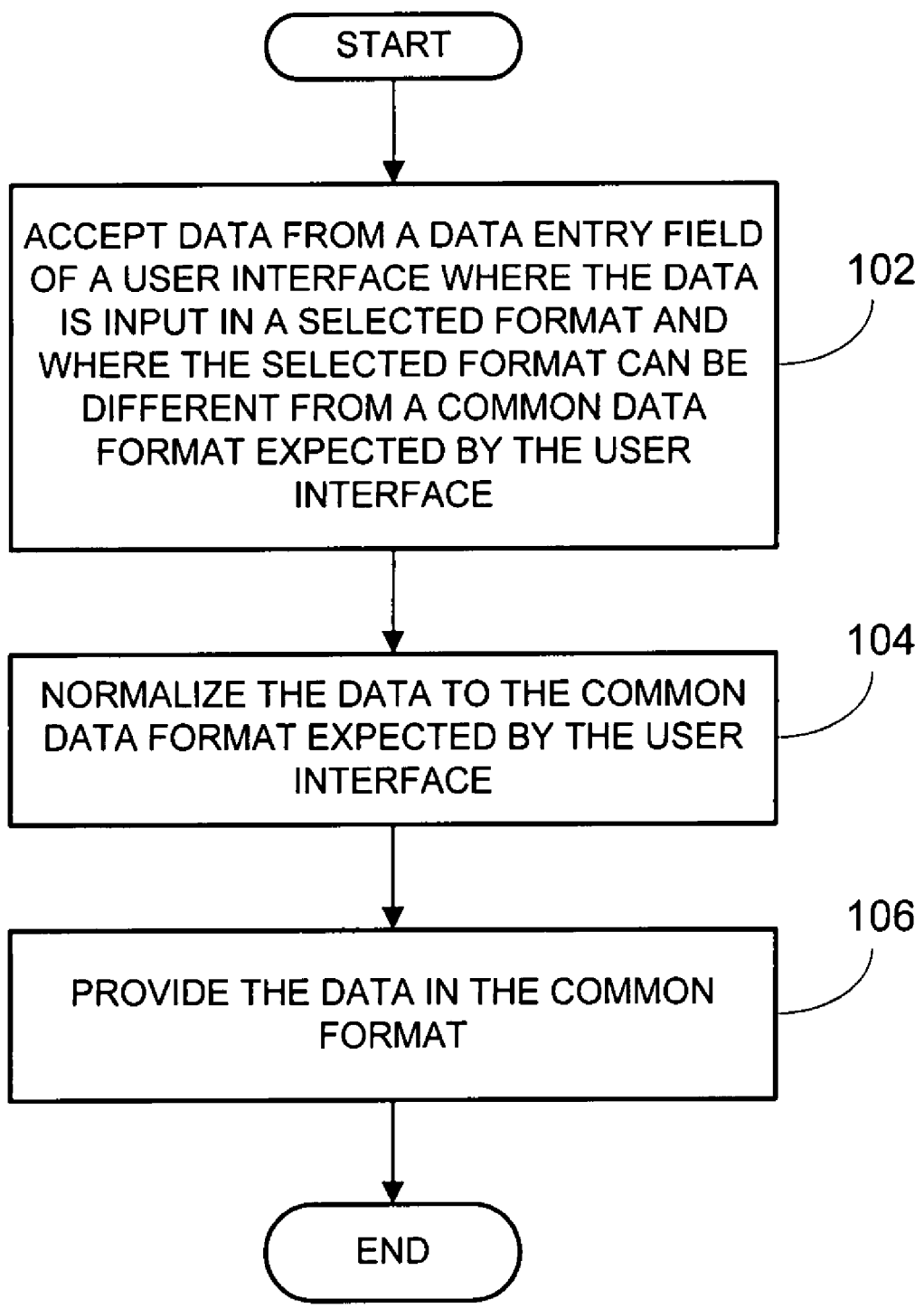
FIG. 1 is a flowchart illustration of a method for using a computer system to interpret data, in accordance with an embodiment of the present invention.
Figures 7A, 7B:
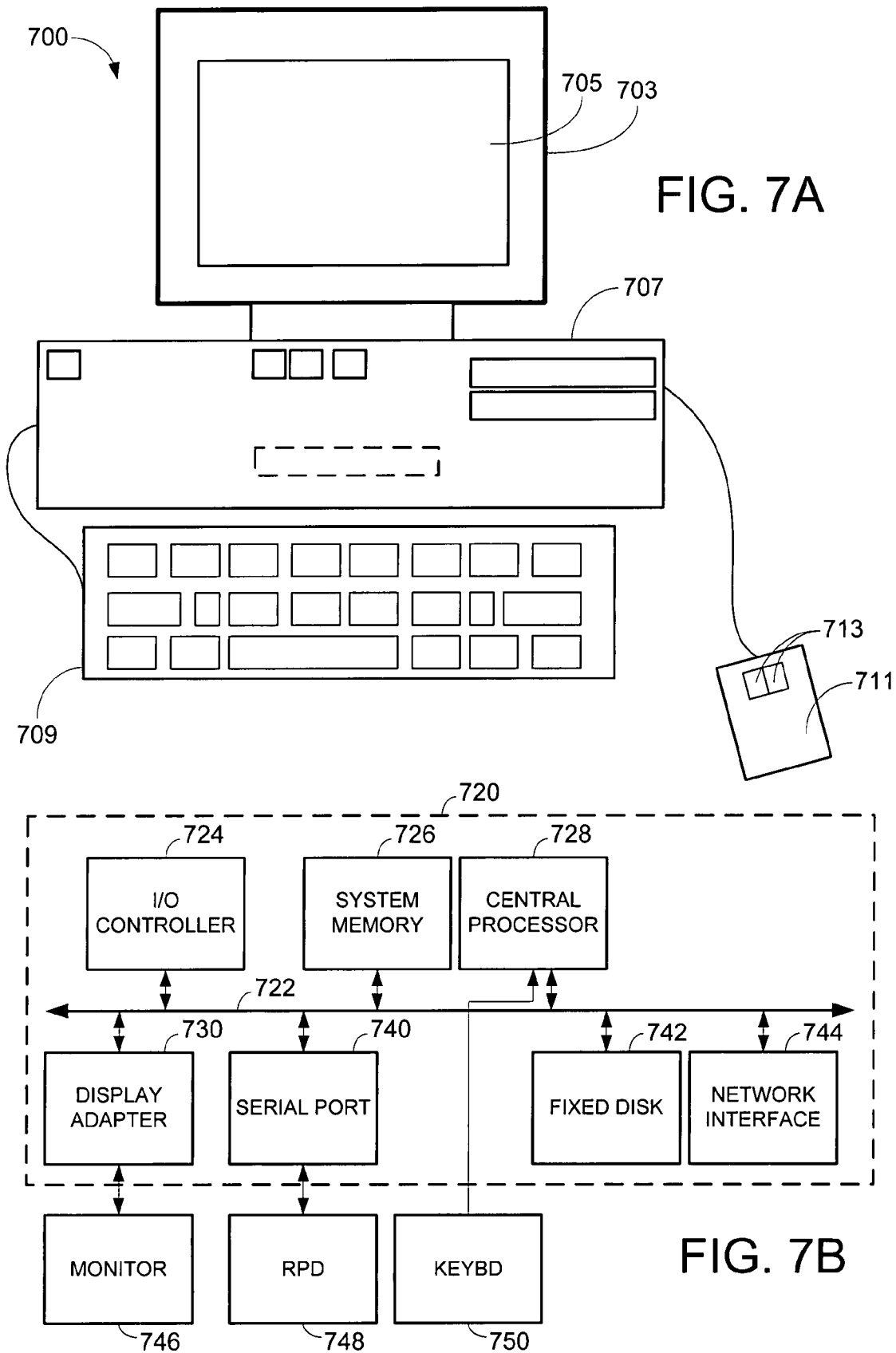
FIG. 7A is a generalized diagram of a exemplary computer suitable for use with embodiments of the present invention.
FIG. 7B shows a subsystems in the exemplary computer of FIG. 7A.

In FIG. 1, according to an embodiment of the present invention, is an illustration of a method for using a computer system to interpret input data. The method begins at operation 102 by accepting input data from a data entry field of an interface. According to embodiments of the present invention, the interface can include, but is not limited to, a graphical user interface (GUI) presented to a display screen 705 of a computer 700, as shown in FIG. 7A; a textual user interface, an online interface, an application program interface (API), or any other software interface controlled by a computer system. In one embodiment of the present invention, the input data can be any type of data including data that can be provided using any one of a number of formats and/or data that can be read as a single uninterrupted string or as having delimiters (e.g. spaces, hyphens, etc.) interleaved between portions of the data string. More particularly, in one embodiment, input data types can include, but are not limited to, telephone numbers, dates, credit card numbers, universal product code (UPC) numbers, international standard book numbers (ISBNs), social security numbers, etc. In one embodiment of the present invention, the input data can be provided by a user or any other input source in a format selected by the user or the input source. As mentioned above, embodiments of the present invention allow a user to provide a system with data in a format that is consistent with the particular user's natural way of thinking rather than forcing the user to provide the data in a format that is expected by tools etc. associated with the system. In this way, the input data can be provided to the system in a format that is different from a common data format expected by the tools, software, online interfaces, etc. associated with the computer system.

At operation 104, the method continues by normalizing the input data to a common format expected by the computer system controlling an interface, according to one embodiment of the present invention. In particular, at operation 104, the method can include identifying a data type associated with a data entry field of the interface, converting the input data into a rudimentary or raw data string using conversion rules associated with the type, and validating the raw data string using validation rules associated with the type, according to one embodiment of the present invention. The data type associated with a particular data entry field can be identified in any manner well known to one of ordinary skill in the art. In one embodiment of the present invention, if the data type identified is a date, the input data can be converted to a raw date string. If the data type identified is a telephone number, the input data can be converted to a raw telephone number string. Likewise, if the data type identified is a credit card number, UPC number, or ISBN, the input data can be respectively converted to a raw credit card string, a raw UPC number string, and a raw ISBN string, and so on. The conversion and validation rules used for converting the input data into a raw data string and validating the raw data string in preparation for normalized formatting can vary based on the type of input data being processed. According to one embodiment of the present invention, these conversion and validation rules are explained in further detail below regarding the discussion of FIGS. 2-6. The method continues at operation 106.

At operation 106, according to one embodiment of the present invention, the input data can be displayed or output by formatting the input data in a common format identified at operation 104. For example, in one embodiment, the computer system can interpret the data input provided by a user or other input source and redisplay the input data to the user in the common format. In another embodiment, if the computer system determines that multiple interpretations of the input data exist, the computer system can choose to a prevailing interpretation or prompt the user to clarify their input data. In yet another embodiment, if the computer system is unable to understand the input data, the computer system can display the user's or the input source's data entry verbatim or yield an error condition in the form of an error message. Specific approaches for validating input data and providing the input data in a common data format are provided in further detail below regarding the discussion of FIGS. 2-6.

Figure 2:
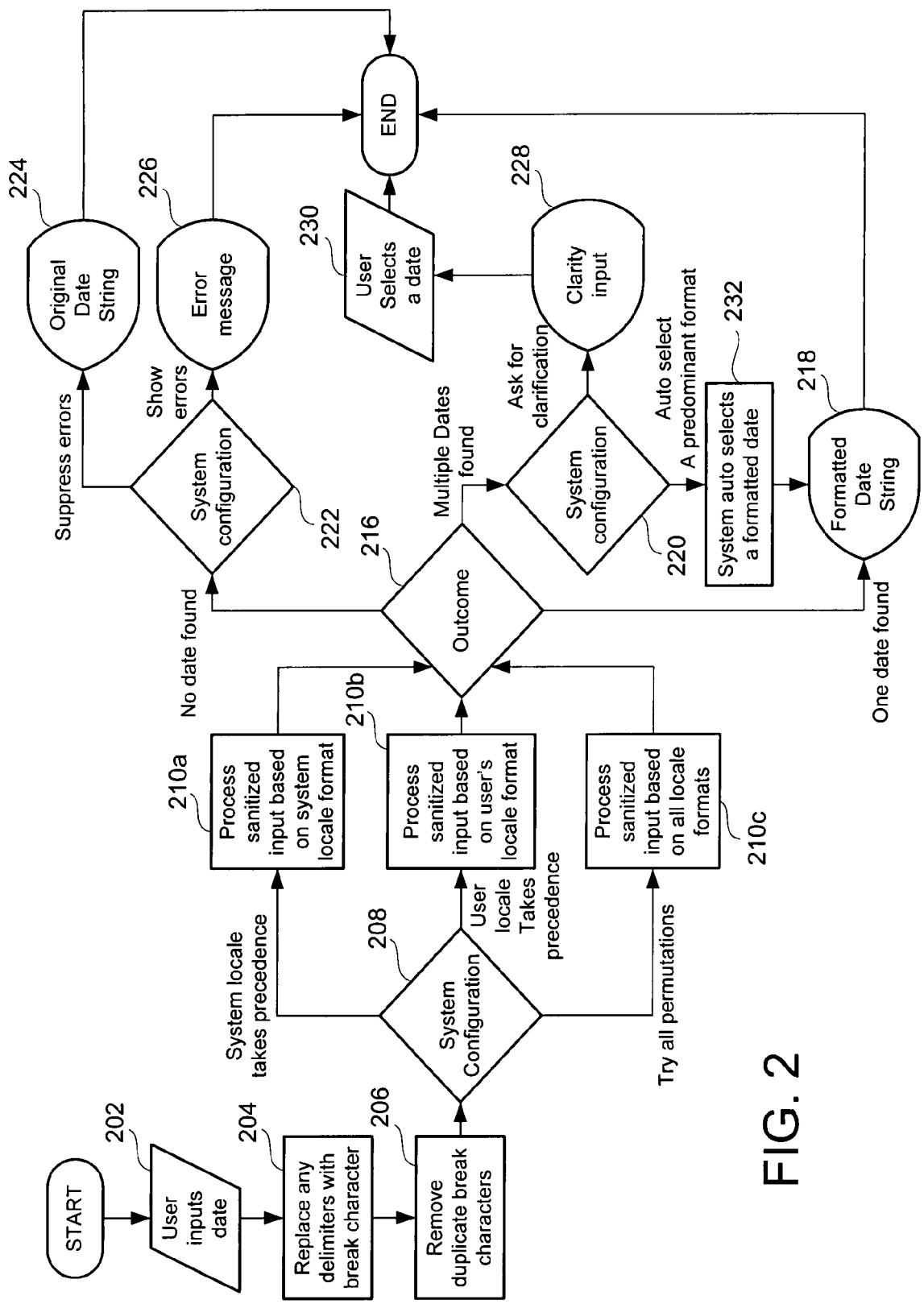
FIG. 2 is a flowchart illustration of a method for using a computer system to interpret date information, in accordance with an embodiment of the present invention.

In FIG. 2, according to one embodiment of the present invention, is an illustration of a method for using a computer system to interpret date-based input data. The method begins at operation 202, where a user or an input source inputs a date (e.g. "Mar. 4, 1992") to a data entry field of an interface controlled by the computer system. The data is entered in a format selected by the user or the input source. For example, such selected formats can include: "March 4, 1992," "4$^{th}$ March, 1992," "4 March 1992," "Mar. 4, 1992," "4$^{th}$ Mar. 1992," "4 Mar. 1992," "March, 4, '92," "3/4/92," "3/4/1992," "3-4-92," "3-4-1992," "4-3-92," "3.4.92," "03041992," "04031992," "3492," "4392," etc. It is important to note that embodiments of the present invention do not require that the user or input source enter the data in a particular format. In fact, the user or input source can enter data in a format that is different from the format expected by the computer system. The method continues at operations 204 and 206.

In operations 204 and 206, the method converts the data input at operation 202 into a raw data string (hereinafter "raw date string") using conversion rules associated date-based data, according to one embodiment of the present invention. More particularly, at operation 204, each delimiter character included in the input data can be replaced with a corresponding break character. This is done by replacing all punctuation, non-alphabetic, and non-numeric characters (e.g. asterisk, comma, period, less than, greater than, forward slash, back slash, pipe, colon, semi-colon, apostrophe, quote, underscore, hyphen, space, etc.) included in the input data with a pre-determined break character. For example, using the pre-determined character "*", the input data "Mar. 4, 1992" is converted to "Mar. 4, 1992." Then, at operation 206, the method continues by removing all duplicate break characters from the input data string. For example, following the example provided immediately above, the string "Mar41992" is converted to the raw date string "Mar*4*1992."

At this point, as discussed below in detail, validation and formatting rules can be applied to each portion of the raw date string to extract month, day, and year information. According to one embodiment of the present invention, the result can be influenced by geographic locale conventions so that, for example, the input data "3/4/1992" is interpreted as "Mar. 4, 1992" in the United States and "3 Apr. 1992" in Europe. Moreover, the result can be selected by the computer system without user intervention in a case where data can be validly interpreted in multiple ways or where only one valid interpretation is found. Alternatively, in one embodiment, the computer system can alert a user or an input source that their data can be validly interpreted in multiple ways. In this case, the system can prompt the user or input source to confirm an intended data entry by requiring the user or input source to select from a list of multiple valid date interpretations identified by the computer system. In another embodiment, the computer system can alert the user or input source that no valid date interpretation was found by providing an error message from the user interface or by simply redisplaying the date entry in the identical format as the date was entered by the user or the input source.

Specifically, at operation 208 a system configuration file or data structure etc. associated with the computer system is accessed to determine whether to validate the raw date string based on a "system locale" format, a "user locale" format, "all locale" formats, or a "user preference" setting, according to one embodiment of the present invention. In one embodiment, the system locale format setting indicates that the raw date string can be validated against all permutations of formatting conventions that are common to the geographic location of a server, website server, any other pre-designated machine, or default location associated with the computer system. For example, if a user enters the date "3/4/92" and the user is located in Europe but using an online interface controlled by a server located in the United States, the resulting date string can be interpreted as "Mar. 3, 1992" based on formatting conventions established in the United States. In one embodiment of the present invention, the user locale format setting indicates that the raw date string can be validated against all permutations of formatting conventions designated in a profile associated with the user or formatting conventions that are common to the current geographic location of the user. For example, if the user enters the date "3/4/1992" and the user is located in Europe but using an online interface controlled by a server located in the United States, the resulting date string can be interpreted as "Apr. 3, 1992" based on formatting conventions established in the Europe. In another embodiment of the present invention, the all locale formats setting indicates that the raw date string can be validated against all permutations of formatting conventions that are both system locale-based and user locale-based. Therefore, continuing with the example provided immediately above, a date entered as "Mar. 4, 1992" can have multiple interpretations that include "Mar. 4, 1992" and "Apr. 3, 1992." The method continues at operation 210.

At operation 210, in one embodiment of the present invention, the raw date string is processed based on formatting rules associated with the system locale, the user locale, or both. Specifically, at operation 210a, the computer system is configured to process the raw date string based on a system locale. Therefore, the raw date string is processed based on formatting rules associated with a system locale to identify one or more valid formats associated with the raw date string. At operation 210b, the computer system is configured to process the raw date string based on a user locale. Therefore, the raw date string is processed based on formatting rules associated with a user locale to identify one or more valid formats associated with the raw date string. Correspondingly, at operation 210c, the raw date string is processed based on formatting rules associated with both a system locale and a user locale, if the computer system is configured to process the raw date string based on all locale formats.

The processing performed at operations 210a, 210b, and 210c includes extracting month, day, and year information from the raw date string based on the setting(s) identified at operation 208, according to one embodiment of the present invention. For example, if the geographic locale of a server and/or a user includes any one of several European countries, the computer system can recognize that dates in such European countries are commonly formatted using a Day, Month, and Year sequence rule. On the other hand, if the geographic locale of a user and/or server is the United States, the computer system can recognize that in the United States dates are commonly formatted using a Month, Day, and Year sequence rule. In one embodiment of the present invention, after the computer system has identified an appropriate sequence rule to apply to the unstructured raw date string, the computer system can then identify all possible valid format permutations that correspond to the raw date string type, using the validation and formatting rules provided below in Table A or Table B:

TABLE A

| Raw Date String Type | Possible Formats (Month, Day, Year) | Validation Rules |
| --- | --- | --- |
| 4 numeric characters | MDYY | M is non-zero<br>D is non-zero<br>YY is a between 00 and 99 (year interpreted relative to 1900) |

TABLE A-continued

| Raw Date String Type | Possible Formats (Month, Day, Year) | Validation Rules |
| --- | --- | --- |
| 5 numeric characters | MDDYY<br>MMDYY | MDDYY:<br>M is non-zero<br>DD is between 01 and the last day of the month as specified in M and YY<br>YY is between 00 and 99 (year interpreted relative to 1900)<br>MMDYY:<br>MM is between 01 and 12<br>D is non-zero<br>YY is between 00 and 99 (year interpreted relative to 1900) |
| 6 numeric characters | MMDDYY<br>MDYYYY | MMDDYY:<br>MM is between 00 and 12<br>DD is between 01 and the lay day of the month as specified in MM and YY<br>YY is between 00 and 99 (year interpreted relative to 1900)<br>MDYYYY:<br>M is non-zero<br>D is non-zero<br>YYYY is the current year or the current year minus 130 |
| 7 numeric characters | MDDYYYY<br>MMDYYYY | MDDYYYY:<br>M is non-zero<br>DD is between 01 and the last day of the month as specified in M and YYYY<br>YYYY is the current year or the current minus 130<br>MMDYYYY:<br>MM is between 01 and 12<br>D is non-zero<br>YYYY is the current year or the current year minus 130 |
| 8 numeric characters | MMDDYYYY | MMDDYYYY:<br>MM is between 01 and 12<br>DD is between 01 and the last day of the month as specified in MM and YYYY |
| alphanumeric characters with delimiters<br>Delimiters can include:<br>[asterisk]<br>[comma]<br>[period]<br>[less_than]<br>[greater_than]<br>[forward_slash]<br>[back_slash]<br>[pipe]<br>[colon]<br>[semi-colon]<br>[apostrophe]<br>[quote]<br>[underscore]<br>[hyphen]<br>[space] | M D YY<br>M D YYYY<br>M DD YY<br>M DD YYYY<br>MM D YY<br>MM D YYYY<br>MMM D YY<br>MMM D YYYY<br>MMM DD YYYY<br>MMMM D YY<br>MMMM D YYYY<br>MMMM DD YY<br>MMMM DD YYYY | M(M)(M)(M) D(D) YY(YY):<br>M is non-zero<br>MM is between 01 and 12<br>D is non-zero<br>DD is between 01 and the last of the month as specified in M() and YY(YY)<br>YY is between 00 and 99. All years will be interpreted relative to 1900<br>YYYY is the current year or the current year minus 130<br>MMM* matches a month abbreviation that is appropriate for a designated geographic locale. For example, in the United States, the list can include: Jan, Feb, Mar, Apr, May, Jun, Jul, Aug, Sep, Oct, Nov, Dec.<br>MMMM* matches a month name that is appropriate for a designated geographic locale. For example, in the United States, the list can include: January, February, March, April, May, June, July, August, September, October, November, December.<br>Note: (*) denotes wildcard character(s). |

TABLE B

| Raw Date String Type | Possible Formats (Day, Month, Year) | Validation Rules |
| --- | --- | --- |
| 4 numeric characters | DMYY | M is non-zero<br>D is non-zero<br>YY is a between 00 and 99 (year interpreted relative to 1900) |
| 5 numeric characters | DDMYY<br>DMMYY | DDMYY:<br>M is non-zero<br>DD is between 01 and the last day of the month as specified in M and YY<br>YY is between 00 and 99 (year interpreted relative to 1900)<br>DMMYY:<br>MM is between 01 and 12<br>D is non-zero<br>YY is between 00 and 99 (year interpreted relative to 1900) |
| 6 numeric characters | DDMMYY<br>DMYYYY | DDMMYY:<br>MM is between 00 and 12<br>DD is between 01 and the lay day of the month as specified in MM and YY<br>YY is between 00 and 99 (year interpreted relative to 1900)<br>DMYYYY:<br>M is non-zero<br>D is non-zero<br>YYYY is the current year or the current year minus 130 |
| 7 numeric characters | DDMYYYY<br>DMMYYYY | DDMYYYY:<br>M is non-zero<br>DD is between 01 and the last day of the month as specified in M and YYYY<br>YYYY is the current year or the current year minus 130<br>DMMYYYY:<br>MM is between 01 and 12<br>D is non-zero<br>YYYY is the current year or the current year minus 130 |
| 8 numeric characters | DDMMYYYY | DDMMYYYY:<br>MM is between 01 and 12<br>DD is between 01 and the last day of the month as specified in MM and YYYY |
| alphanumeric characters with delimiters<br>Delimiters can include:<br>[asterisk]<br>[comma]<br>[period]<br>[less_than]<br>[greater_than]<br>[forward_slash]<br>[back_slash]<br>[pipe]<br>[colon]<br>[semi-colon]<br>[apostrophe]<br>[quote]<br>[underscore]<br>[hyphen]<br>[space] | D M YY<br>D M YYYY<br>DD M YY<br>DD M YYYY<br>D MM YY<br>D MM YYYY<br>D MMM YY<br>D MMM YYYY<br>DD MMM YYYY<br>D MMMM YY<br>D MMMM YYYY<br>DD MMMM YY<br>DD MMMM YYYY | D(D) M(M)(M)(M) YY(YY):<br>M is non-zero<br>MM is between 01 and 12<br>D is non-zero<br>DD is between 01 and the last of the month as specified in M() and YY(YY)<br>YY is between 00 and 99. All years will be interpreted relative to 1900<br>YYYY is the current year or the current year minus 130<br>MMM* matches a month abbreviation that is appropriate for a designated geographic locale. For example, in the United States, the list can include: Jan, Feb, Mar, Apr, May, Jun, Jul, Aug, Sep, Oct, Nov, Dec.<br>MMMM* matches a month name that is appropriate for a designated geographic locale. For example, in the United States, the list can include: January, February, March, April, May, June, July, August, September, October, November, December.<br>Note: (*) denotes wildcard character(s). |

At operation 216, the result of the processing performed at operation 210 can include one of three outcomes, according to one embodiment of the present invention. Specifically, the result can be that no date is found, multiple dates are found, or only one date is found. In the case where no date is found, the method continues at operation 222. In the case where multiple dates are found, the method continues at operation 220. In the case where only one date is found, the method continues at operation 218.

At operation 222, in one embodiment of the present invention, if no valid format is identified from the raw date string, an error condition is identified by the computer system. In this case, a configuration setting of the computer system can determine whether the error condition is suppressed or whether the error condition is shown. In one embodiment of the present invention, at operation 224, if the error condition is suppressed, the original date string input by a user or data input source can be redisplayed to the user or the data input source or otherwise provided to the user or the data input source. In another embodiment of the present invention, at operation 226, if the error condition is not suppressed (i.e. shown) an error message can be displayed or provided to the user or the data input source. In one embodiment, the error message can include information that identifies why the date input could not be interpreted. The error message can also provide information that suggests modifications that will overcome the error condition. However, it is important to note that the present invention is not limited to a particular approach for handling error conditions.

At operation 220, in one embodiment of the present invention, if multiple valid formatted dates are identified for the raw date string at operations 210 and 216, a configuration setting of the computer system can determine whether the computer system asks for clarification regarding the multiple valid date formats identified or whether the computer system automatically selects a predominant format from among the multiple valid formats without intervention from a user or data input source. At operation 228, in one embodiment, if the computer system is configured to ask for clarification the method continues at operation 230 where the user or data input source can select a preferred date format from among the multiple valid date formats identified at operations 210 and 216. In another embodiment, if the computer system is configured to automatically select a predominant format from among the multiple valid formatted dates, the method continues at operation 232 where the computer system auto selects a formatted date. At operation 232, the computer system can identify the predominant format used to select the formatted date by a historical or user-specified preference, a location-based preference, or a hard-coded computer system default. Once a formatted date is selected by the computer system at operation 232, the method continues at operation 218 where the computer system outputs the selected date string in the common format.

In one embodiment of the present invention, if only one valid formatted date is derived from the raw date string at operations 210 and 216, the method continues at operation 218. At operation 218, the computer system outputs the one valid date string in the common format.

Figure 3:
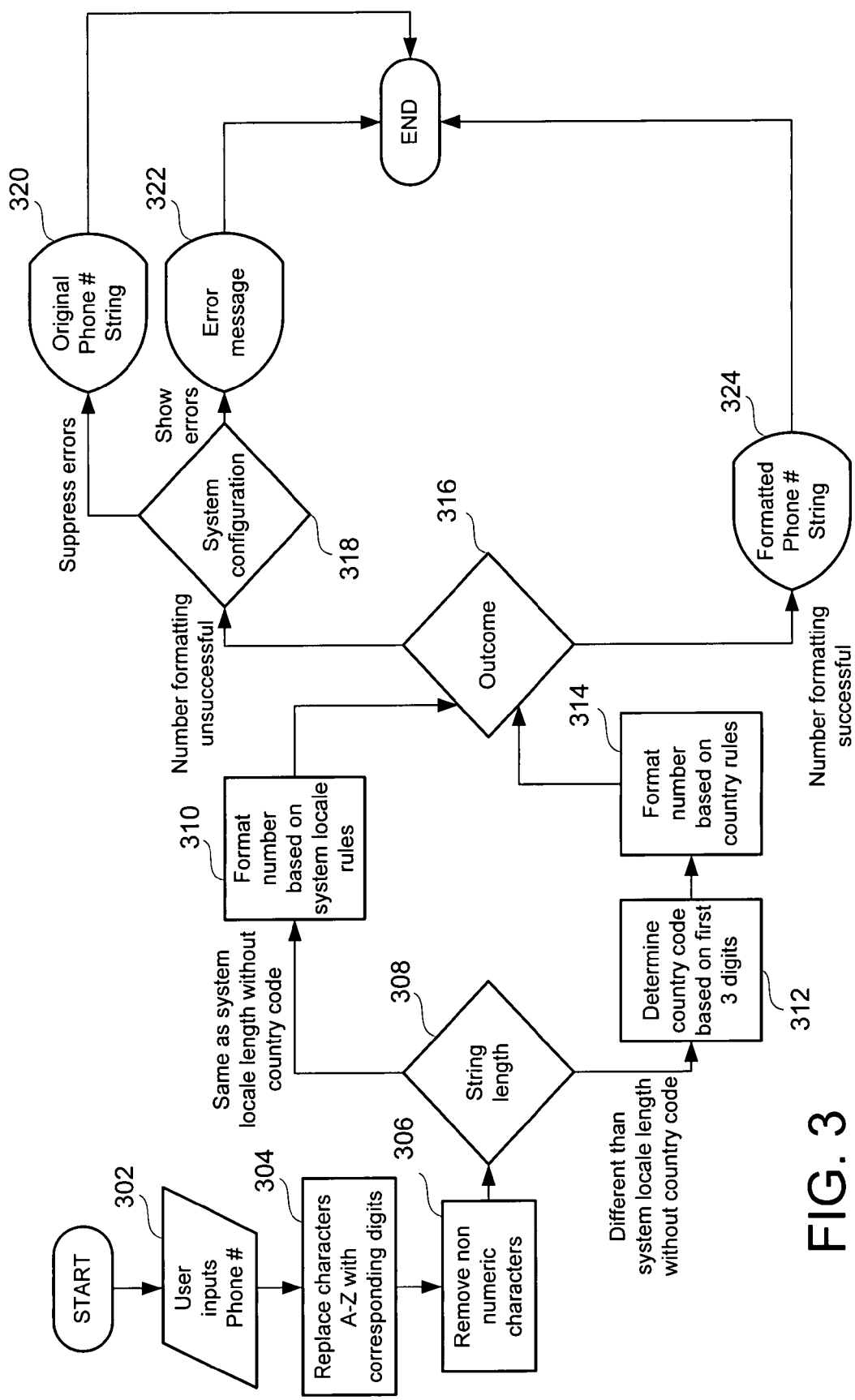
FIG. 3 is a flowchart illustration of a method for using a computer system to interpret telephone number information, in accordance with an embodiment of the present invention.

In FIG. 3, according to one embodiment of the present invention, is an illustration of a method for using a computer system to interpret telephone number-based input data. The method begins at operation 302, where a user or input source inputs a telephone number string (e.g. "408-555-1212") to a data entry field of a user interface in a format selected by the user or data input source. For example, such selected formats can include: "(408) 555-1212," "408.555.1212," "+1 (408) 555-1212," "408 555-1212," "4085551212," "14085551212," etc. It is important to note that embodiments of the present invention do not require that the user or input source enter the data in a particular format. In fact, the user or input source can enter data in a format that is different from the format expected by the computer system. The method continues at operations 304 and 306.

At operations 304 and 306, the method converts the data input at operation 302 into a raw data string (hereinafter "raw telephone number string") using conversion rules associated telephone number-based data, according to one embodiment of the present invention. More particularly, at operation 304, any alphabetic character included in the input data is converted into its corresponding telephone keypad code. In one embodiment of the present invention, alphabetic characters A, B, and C are each converted to the numeric character 2; alphabetic characters D, E, and F are each converted to the numeric character 3; alphabetic characters G, H, and I are each converted to the numeric character 4; alphabetic characters J, K, and L are each converted to the numeric character 5; alphabetic characters is M, N and O are each converted to the numeric character 6, alphabetic characters P, R, and S are each converted to the numeric character 7; alphabetic characters T, U, and V are each converted to the number character 8; and alphabetic characters W, X, and Y are each converted to the numeric character 9. For example, input data string "(408) 555-1A1A" becomes "(408) 555-1212" by converting each character 'A' into its numeric keypad code character equivalent '2'. Then at operation 306, any non-numeric character remaining in the input data string is removed to form the raw telephone number string. For example, input data string formed at operation 304, namely "(408) 555-1212," is converted into the raw telephone number string "408555121" by removing non-numeric characters '(', ')', [space], and '-'. Following the conversion of the input data into a raw telephone number string at operations 304 and 306, standard rules regarding country code and area code validation can be applied to the raw telephone number string to determine a common format, as discussed in more detail below. The method continues at operation 308.

Beginning at operation 308, according to one embodiment of the present invention, the raw telephone number string is processed based on formatting rules associated with a system locale or a country locale derived from the raw telephone number string itself, or a user preference setting. In other words, the raw telephone number string can be processed based on formatting rules that are common to a geographic location where a server, website server, or pre-designated machine etc. associated with the computer system is located. According to an embodiment of the present invention, the geographic location can be any country, territory, province, state, city, municipality, etc. Alternatively, the raw telephone number string can be processed based on formatting rules associated with the country, territory, etc. corresponding to the country code prefix included in the raw telephone number string. The raw telephone number string can also be processed based on user preference settings that are contained in a user profile, etc.

At operation 308, in one embodiment of the present invention, a length of the raw telephone number string, excluding any country code prefix, is determined. The length is then compared to an expected length, also excluding any country code prefix, of a telephone number in the geographic location (i.e. system locale) associated with the computer system. If the length of the raw telephone number string is equal to the expected length of a telephone number in the geographic location associated with the computer system, the method continues at operation 310 where, as discussed in further detail below, the raw telephone number string is formatted according to the rules of the geographic location associated with the computer system. For example, if a user in the United States enters the telephone number "408.555.1212" in a data entry field of a user interface of a website hosted by a server located in the United States, the entry will first be converted to raw telephone number string "4085551212" which has a length of ten. Next, because the server hosting the website being used by the user is based in the United States, the expected length of a telephone number in the United States can be governed by the North American Numbering Plan (NANP) which serves several North American countries including, the United States and its territories. According to NANP, telephone numbers are ten-digit numbers consisting of a three-digit Numbering Plan Area (NPA) code, commonly called an area code, followed by a seven-digit local number. Therefore, because the length of the raw telephone number string "4085551212," which is ten, is equal to the expected length of a telephone number in the United States, which is also ten, the raw telephone number string "4085551212" will be normalized according to the commonly established formatting rules of the United States.

If, on the other hand, the length of the raw telephone number string is different from the expected length of a telephone number in the geographic location associated with the computer system, the method continues at operation 312 where, as discussed in further detail below, the raw telephone number string is formatted according to the rules of the country or territory etc. associated with the country code prefix included the raw telephone number string. For example, if a user in Brazil enters the telephone number "55 11 12345678" in a data entry field of the United States-based website discussed above, the Brazilian user's entry will be converted to the raw telephone number string "551112345678" which has a length of twelve. Because the length of the raw telephone number string "551112345678" is different from the expected length of ten for telephone numbers in the United States, raw telephone number string "551112345678" will be normalized according to the commonly established formatting rules a country or territory corresponding to the country code prefix found in the raw telephone number string "551112345678."

At operation 310, according to one embodiment of the present invention, the computer system will process the raw telephone number string according to system locale formatting and/or validation rules followed in the geographic location of a server, website server, etc. associated with the computer system. For example, under the NANP formatting and validation rules followed in several North American countries or territories, a telephone number format is usually represented as: NXX-NXX-XXXX or (NXX) NXX-XXXX where N can be any numeric digit from two through nine and X can be any numeric digit from zero through nine. The outcome of this formatting and/or validation process is determined at operation 316. If the formatting and/or validation process is unsuccessful, the method continues at operation 318. If the formatting and/or validation process is successful, the method continues at operation 324.

At operation 312, according to one embodiment of the present invention, the computer system first determines a country code prefix associated with the raw telephone number string. In one embodiment, the computer system can make this determination by using the first three characters of the raw telephone number string to identify the country code prefix. For example, the first three characters of raw telephone number string "551112345678" form a "551" substring which corresponds to the country designation for Brazil. The method continues at operation 314.

At operation 314, according to one embodiment of the present invention, the computer system will process the raw telephone number string according to the formatting and/or validation rules followed in the geographic location identified by the country code included in the raw telephone number string at operation 312. The outcome of this formatting and/or validation process is determined at operation 316. If the formatting and/or validation process is unsuccessful, the method continues at operation 318. If the formatting and/or validation process is successful, the method continues at operation 324.

At operation 318, according to one embodiment of the present invention, if no valid format is derived from the raw date string, an error condition is identified by the computer system. In this case, a configuration setting of the computer system determines whether the error condition is suppressed or whether the error condition is shown. In one embodiment of the present invention, if the error condition is suppressed, the original date string input by a user or data input source can be redisplayed to the user or the data input source or otherwise provided to the user or the data input source at operation 320. In another embodiment of the present invention, if the error condition is not suppressed (i.e. shown) an error message can be displayed or provided to the user or the data input source at operation 322. In one embodiment, the error message can include information that identifies why the telephone number entry could not be interpreted. The error message can also provide information that suggests modifications that will overcome the error condition. However, it is important to note that the present invention is not limited to a particular approach for handling error conditions.

At operation 324, according to one embodiment of the present invention, if the raw telephone number string is successfully formatted at operation 310 or at operation 314, the computer system outputs the raw telephone number string in a common format. For example, the raw telephone number string "4085551212" can be normalized to the common format "(408) 555-1212" and the raw telephone number string "551112345678" can be normalized to the common format "+55 (11) 1234-5678." In both examples, geographic locale rules are applied to interpret the raw telephone number string and the raw telephone number string is output in a format that is native or common to an appropriate geographic locale. In an alternate embodiment of the present invention, the country code or area code of the raw telephone number string can be replaced with a name or a graphical representation (e.g. a flag or country/territory outline, etc.) of the geographic location served by the telephone number. The name and the graphical representation or element indicate a geographical context for the telephone number. For example, the raw telephone number string "551112345678" can be formatted and output as the common format "Brazil (11) 1234-5678," "[BRAZILIAN FLAG] (11) 1234-5678," "+55 (11) 1234-5678," or any combination of locale name, locale flag, and/or locale code followed by the formatted phone number. In a further alternate embodiment of the present invention, the country code or area code of the raw telephone number string can be replaced with a name or a graphical representation (e.g. a flag or country/territory outline, etc) of the geographic location served by the telephone number. The name and the graphical representation or element indicate a geographical context for the telephone number.

Figure 4:
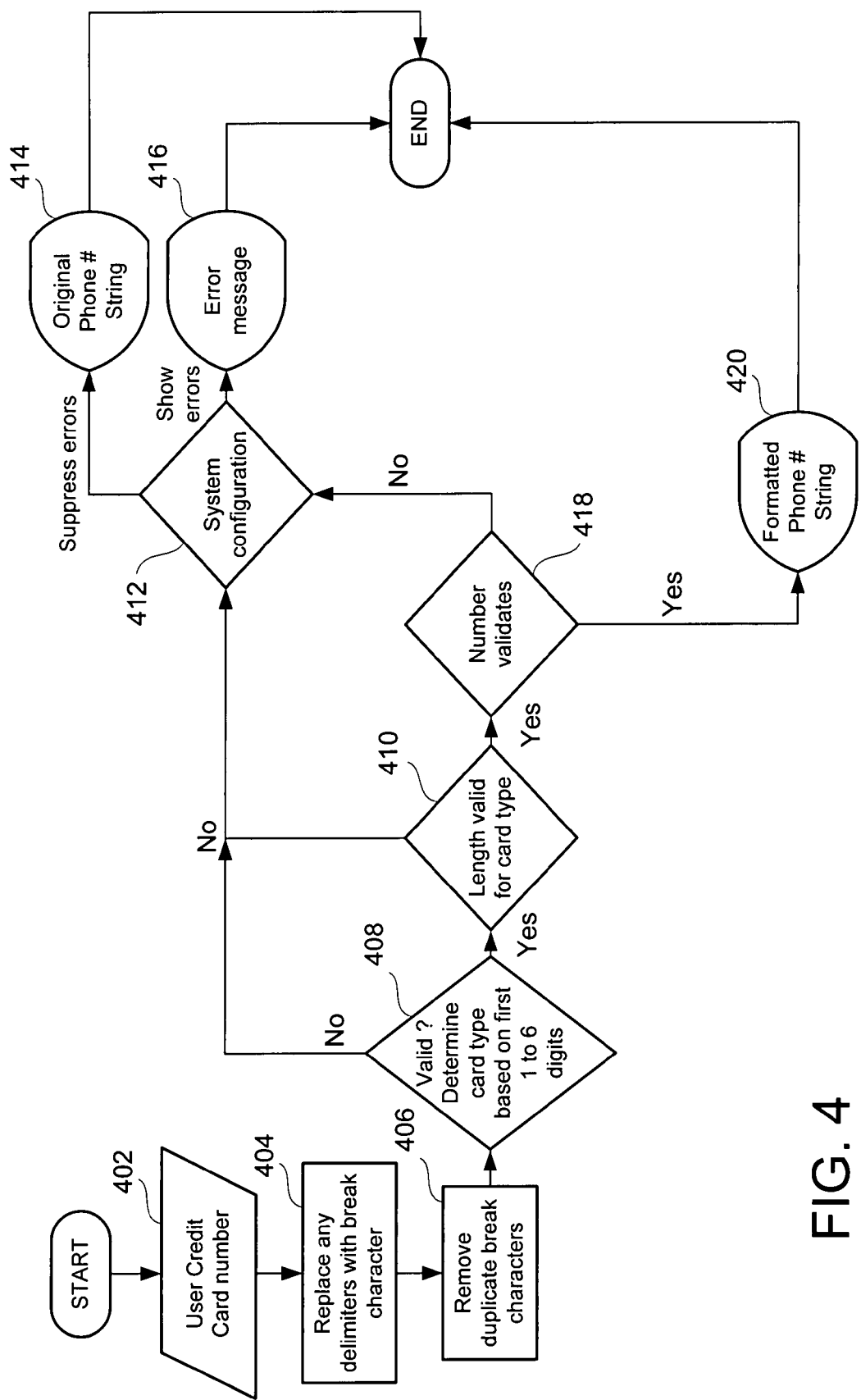
FIG. 4 is a flowchart illustration of a method for using a computer system to interpret credit card information, in accordance with an embodiment of the present invention.

In FIG. 4, according to one embodiment of the present invention, is an illustration of a method for using a computer system to interpret credit card-based input data. The method begins at operation 402, where a user or an input source inputs a credit card number to a data entry field of a user interface in a format selected by the user or the input source. It is important to note that embodiments of the present invention do not require that the user or input source enter the data in a particular format. In fact, the user or input source can enter data in a format that is different from the format expected by the computer system. The method continues at operations 404 and 406.

At operations 404 and 406, the method converts the data input at operation 402 into a raw data string (hereinafter "raw credit card string") using conversion rules associated credit card-based data, according to one embodiment of the present invention. More particularly, at operation 404, each delimiter character included in the input data is replaced with a corresponding break character. This is done by replacing all punctuation, non-alphabetic, and non-numeric characters (e.g. asterisk, comma, period, less than, greater than, forward slash, back slash, pipe, colon, semi-colon, apostrophe, quote, underscore, hyphen, space, etc.) included in the input data with a pre-determined break character. For example, using the pre-determined character "*", the credit card input data "4000-000000-00000" is converted to "4000*000000**00000". Then, at operation 406, the method continues by removing all duplicate break characters from the input data string. As such, following the example provided immediately above, the string "4000*000000**00000" is converted to the raw credit card string "4000*000000*00000." The raw credit card string can then be stripped of all non-numeric digit characters, including any delimiter characters now included in the raw credit card string. For example, the raw credit card string "4000*000000*00000" is converted to "400000000000000." The method continues at operations 408 and 410 where the resulting raw credit card string is validated for proper starting sequence and proper length.

At operation 408, according to one embodiment of the present invention, the computer system determines a credit card type corresponding to a credit card number represented by the raw credit card string. Specifically, the raw credit card string is checked for a proper starting number sequence (i.e. prefix) to determine what if any card type is associated with the credit card number represented by the raw credit card string. In one embodiment of the present invention, all or some subset of the first six characters of the raw credit card string can be used to determine the card type. For example, Visa™ credit cards typically begin with the start sequence number "4" and American ExpreSS™ credit cards typically begin with the start sequence number "34" or the start sequence number "37," as further illustrated in Table C below. If a valid card type corresponding to the raw credit card string is not found, the method continues at operation 412. Otherwise, if a valid card type corresponding to the raw credit card string is found, the method continues at operation 410.

At operation 410, according to one embodiment of the present invention, the credit card number corresponding to the raw credit card string is checked for a proper length and a proper start sequence that is associated with the card type identified at operation 408. For example, Visa™ credit card numbers typically include either 13 or 16 digits and American Express™ credit card numbers typically include 15 digits, as further illustrated in Table C below.

TABLE C

| Credit Card Type | Prefix (Start Sequence) | Length |
|---|---|---|
| American Express ™ | 34 or 37 | 15 |
| Diners Club International ™ | 36 | 14 |
| Diners Club USA & Canada ™ | 55 | 16 |
| Discover Card ™ | 6011 or 650 | 16 |
| JCB ™ | 3 | 16 |
| JCB ™ | 1800 or 2131 | 15 |
| Maestro Debit Card ™ | 5020 or 6 | 16 |
| MasterCard ™ | 51, 52, 53, 54, or 55 | 16 |
| Solo Debit Card ™ | 6334 or 6767 | 16, 18, or 19 |
| Switch Debit Card ™ | 4903, 4905, 4911, 4936, 564182, 633110, 6333, or 6759 | 16, 18, or 19 |
| Visa ™ | 4 | 13 or 16 |
| Visa Electron ™ | 417500, 4917, or 4913 | 16 |

If the length of the credit card number corresponding to the raw credit card string is not valid, the method continues at operation 412. Otherwise, if the credit card number corresponding to the raw credit card string has a valid length, the method continues at operation 418.

At operation 418, according to one embodiment of the present invention, the credit card number corresponding to the raw credit card string is validated. In one embodiment of the present invention, the Luhn formula is used to validate the credit card number. The Luhn formula, also known as the "modulus 10" or "mod 10," is a checksum formula used to validate identification numbers, including credit card numbers. Although a brief discussion of the Luhn formula is provided below, further explanation can be found by reference to: U.S. Pat. No. 2,950,048, filed Jan. 6, 1954, entitled "Computer for Verifying Numbers, which is incorporated herein by reference." However, it is important to note that any algorithm can be used to validate the credit card number, according to embodiments of the present invention.

According to the Luhn Formula, starting with the rightmost digit of the raw credit card string and moving left, double every value of every second digit. For digits that become ten or more as a result of the doubling, add each digit of the result together. For example, credit card number "373400000000000" becomes "353800000000000" (3, 7×2=14 and 1+4=5, 3, 4×2, 0, 0×2, 0, 0×2, 0, 0×2, 0, 0×2, 0, 0×2, 0). Then sum all of the resulting digits of the credit card number together. For example, the sum of credit card number "353800000000000" is "19" (3+5+3+8+0+0+0+0+0+0+0+0+0+0+0=19). If the resulting sum is not a multiple of ten (i.e. does not end in the number 0), the credit card number corresponding to the raw credit card string is invalid, the method continues at operation 412. Otherwise, if the resulting sum is a multiple of 10 (i.e. ends in the number 0) then the credit card number is valid, the method continues at operation 420.

At operation 412, according to one embodiment of the present invention, if no valid credit card number is derived from the raw credit card string, an error condition is identified by the computer system. In this case, a configuration setting of the computer system determines whether the error condition is suppressed or whether the error condition is shown. In one embodiment of the present invention, if the error condition is suppressed, the original credit card number input by a user or data input source can be redisplayed to the user or the data input source, or otherwise provided to the user or the data input source at operation 414. In another embodiment of the present invention, if the error condition is not suppressed (i.e. shown) an error message can be displayed or provided to the user or the data input source at operation 416. In one embodiment, the error message can include information that identifies why the credit card number entry could not be interpreted. The error message can also provide information that suggests modifications that will overcome the error condition. However, it is important to note that the present invention is not limited to a particular approach for handling error conditions.

At operation 420, the raw credit card string can be output or displayed to the user or input source in a common format that is generally understood to be used by credit card numbers. For example, an entry of "5466160012345678" after validation and formatting can be redisplayed as "5466 1600 1234 5678" or "5466-1600-1234-5678" depending upon a configuration associated with the computer system. In an alternate embodiment, information derived from the credit card number associated with the raw credit card string, such as credit card type, issuing bank, and/or issuing bank's geographical location can be displayed. For example, the credit card entry "5466160012345678" can yield "Citibank MasterCard (USA): 5466-1600-1234-5678."

Figure 5:
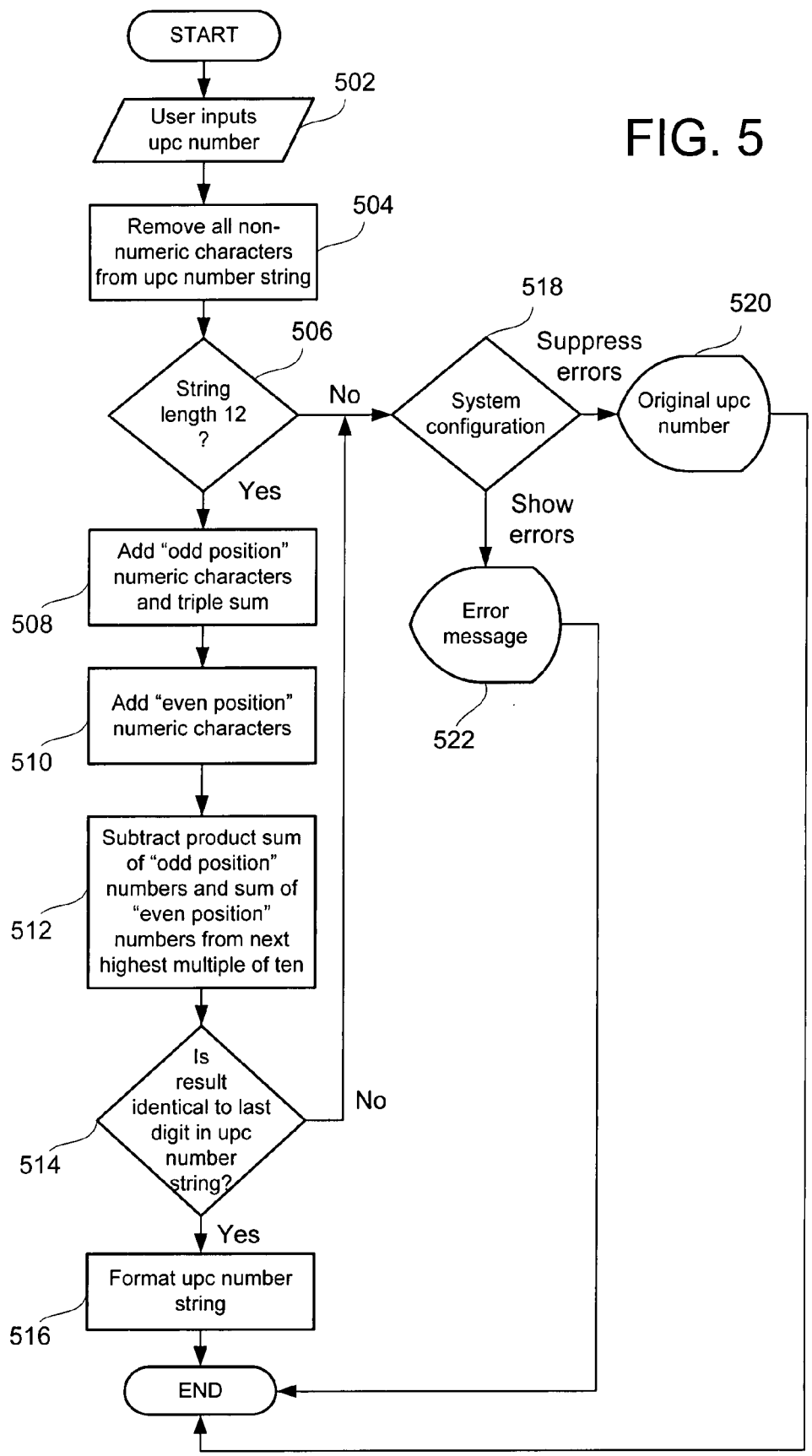
FIG. 5 is a flowchart illustration of a method for using a computer system to interpret universal product code (UPC) information, in accordance with an embodiment of the present invention.

In FIG. 5, according to one embodiment of the present invention, is an illustration of a method for using a computer system to interpret Universal Product Code (UPC) number-based input data. The method begins at operation 502, where a user or an input source inputs a UPC number to a data entry field of an interface in a format selected by the user or the input source. It is important to note that embodiments of the present invention do not require that the user or input source enter the data in a particular format. In fact, the user or input source can enter the data in a format that is different from the format expected by the interface of the computer system. The method continues at operations 504 and 506.

At operation 504, in one embodiment of the present invention, a Universal Product Code (UPC) number can be validated by ensuring that a UPC number data entry is stripped of any non-numeric digit characters to form a raw Universal Product Code (UPC) number string. At operation 506, the resulting raw Universal Product Code (UPC) number string can then be compared against an appropriate pre-determined constant value (e.g. 12 characters) to check that the Universal Product Code number corresponding to the raw Universal Product Code number string has a valid length. If no valid length is determined, the method continues at operation 518. However, if a valid length is determined, the Universal Product Code number corresponding to the raw Universal Product Code number string can be further validated beginning at operation 508. Specifically, in one embodiment of the present invention, calculations from "odd position" and "even position" numeric characters of the raw UPC number string can be compared against a UPC check-digit included in the UPC number string to validate the raw UPC number string.

At operation 508, in one embodiment of the present invention, validating the Universal Product Code number corresponding to the raw Universal Product Code number string can include calculating a first sum equal to a sum of all "odd position" numeric characters in the raw Universal Product Code number string. Then, a product-sum equal to three times the first sum can be calculated.

At operation 510, a second sum equal to a sum of the "even position" numeric characters in the raw Universal Product Code number string can also be calculated, according to one embodiment of the present invention. The method continues at operation 512.

At operation 512, in one embodiment of the present invention, a third sum equal to the first sum plus the product-sum can be calculated. Then, a next highest multiple of ten of the third sum can also be calculated, according to one embodiment of the present invention. The third sum can then be subtracted from the next highest multiple of ten of the third sum. If the Universal Product Code number corresponding to the raw Universal Product Code number string is valid, the resulting difference should be equal to the last numeric digit of the Universal Product Code number (i.e. UPC check-digit) and the method continues at operation 516. Otherwise, the method continues at operation 518.

At operation 516, the raw Universal Product Code number string can be output or redisplayed to a user or input source in a common data format that is generally recognized for being used with Universal Product Code numbers. For example, an entry of "064200115896," after validation and formatting, can be output or redisplayed as "0 64200 11589 6." In an alternate embodiment of the present invention, information derived from the Universal Product Code number can be used to display manufacturer etc. information. For example, UPC code entry "064200115896" can yield "Coca Cola Company item no. 115896."

At operation 518, if the Universal Product Code number corresponding to the raw Universal Product Code number string has an improper length or the Universal Product Code number is an invalid number, an error condition can be identified by the computer system. In this case, a configuration setting of the computer system determines whether the error condition is suppressed or whether the error condition is shown. At operation 520, in one embodiment of the present invention, if the error condition is suppressed, the original UPC number entered by a user or data input source can be redisplayed or output to the user or the data input source. At operation 522, in another embodiment of the present invention, if the error condition is not suppressed (i.e. shown) an error message can be displayed or provided to the user or the data input source. In one embodiment, the error message can include information that identifies why the UPC number entry could not be interpreted. The error message can also provide information that suggests modifications that will overcome the error condition. However, it is important to note that the present invention is not limited to a particular approach for handling error conditions.

Figure 6:
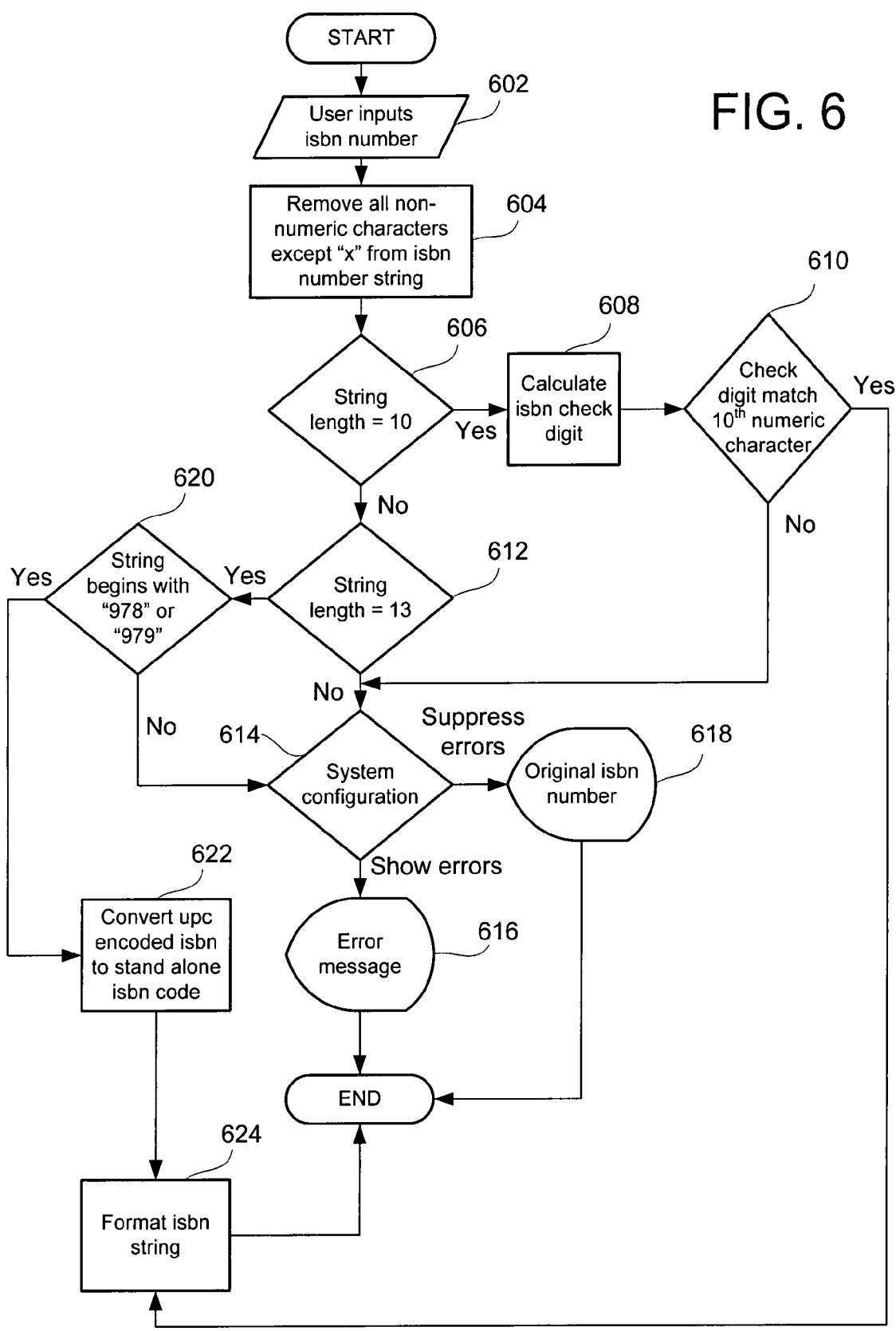
FIG. 6 is a flowchart illustration of a method for using a computer system to interpret international standard book number (ISBN) information, in accordance with an embodiment of the present invention.

In FIG. 6, according to one embodiment of the present invention, is an illustration of a method for using a computer system to interpret international standard book number (ISBN)-based input data. The method begins at operation 602, where a user or an input source inputs an ISBN to a data entry field of an interface in a format selected by the user or the input source. It is important to note that embodiments of the present invention do not require that the user or input source enter the data in a particular format. In fact, the user or input source can enter the data in a format that is different from the format expected by the interface controlled by the computer system. The method continues at operations 604.

At operation 604, in one embodiment, ISBN numbers can be validated by ensuring that a data entry is stripped of any non-numeric digit characters (except for the alphabetic character 'x') to form a raw international standard book number (ISBN) string. The method continues at operation 606.

At operations 606, the resulting raw ISBN number string can then be compared against a pre-determined constant value (e.g. 10 or 13 characters) to check that the ISBN number corresponding to the raw ISBN string has a valid length. If the length is equal to a first pre-determined constant value (e.g. 10) the method continues at operation 608. Otherwise, the method continues at operation 612.

At operation 608, in the case where raw ISBN string contains 10 characters, the first nine characters of the raw ISBN string can be used to calculate an ISBN check-digit. ISBN codes reserve the last digit (i.e. ISBN check-digit) as a check to ensure that preceding digits are valid. This protects against the arbitrary creation of ISBN codes. The ISBN check-digit can be used to validate an ISBN. The method continues at operation 610.

At operation 612, if the length is equal to a second predetermined constant value (e.g. 13), the method continues at operation 620. Otherwise, the method continues at operation 614.

At operation 610, if the ISBN check-digit is matches the tenth character of the raw ISBN string, the ISBN corresponding to the raw ISBN string is a valid ISBN code, and the method continues at operation 624. Otherwise, the method continues at operation 614.

At operation 620, in the case where the raw ISBN string contains 13 characters, the ISBN is a UPC encoded ISBN and the raw ISBN string must begin with a "978" substring or a "979" substring. If the raw ISBN string begins with the "978" or "979" substring, the ISBN number corresponding to the raw ISBN string is validated as a properly formatted UPC encoded ISBN, and the method continues at operation 622. Otherwise the method continues at operation 614. However it is important to note that other adopted standards for verifying a UPC encoded ISBN can be used with embodiments of the present invention.

At operation 622, in one embodiment of the present invention, the raw ISBN string corresponding to the UPC encoded ISBN can then be converted into a standalone ISBN code. Specifically, in one embodiment of the present invention, to convert the UPC encoded ISBN into a standalone ISBN code, the fourth through twelfth characters of the raw ISBN string can be extracted and used to calculate an ISBN check-digit. The ISBN check-digit can then be appended to the fourth through twelfth character substring of the raw ISBN string to form the standalone ISBN code. Both UPC and ISBN codes reserve the last digit as a check to ensure that the preceding digits are valid. This prevents someone from arbitrarily creating a UPC or ISBN code. When one converts a UPC-encoded-ISBN number into a standalone ISBN number, one must recalculate the check digit since UPC check-digits are calculated differently from ISBN check-digits. Check digit calculations for ISBN-10 and ISBN-13 codes can be found by reference to: http://en/wikipedia.org/wiki/Isbn. The method continues at operation 624.

At operation 624, the validated raw ISBN string can be output or redisplayed in one of several common formats, according to one embodiment of the present invention. Such common formats can include, but are not limited to: a hyphenated sequence based on ISBN international rules; an alphanumeric string; or an abstraction of information contained within the raw ISBN string, where the abstraction information can include any combination of a country of origin or language code, a publisher, or an item number.

At operation 614, if the ISBN corresponding to the raw ISBN string has an improper length or the ISBN is an invalid number, an error condition can be identified by the computer system. In this case, a configuration setting of the computer system determines whether the error condition is suppressed or whether the error condition is shown. At operation 618, in one embodiment of the present invention, if the error condition is suppressed, the original ISBN entered by a user or data input source can be redisplayed or output to the user or the data input source. At operation 616, in another embodiment of the present invention, if the error condition is not suppressed (i.e. shown) an error message can be displayed or provided to the user or the data input source. In one embodiment, the error message can include information that identifies why the ISBN entry could not be interpreted. The error message can also provide information that suggests modifications that will overcome the error condition. However, it is important to note that the present invention is not limited to a particular approach for handling error conditions.

In view of the discussion above, an advantage of embodiments of the present invention is the capability to allow a user or input source etc. to provide structured or unstructured information to an interface of a computer system in a format that is native to the user or input source, even if the format is one that is not expected by the computer system or tools or interfaces associated with the computer system. This approach improves the overall user etc. experience and allows for faster data entry because users etc. do not need to concern themselves with compliance with data entry rules. Moreover, as mentioned above, the type of information that can be interpreted by the computer interface of embodiments of the present invention can include any structured or unstructured data type. For example, other data types can include social security numbers, passport numbers, part numbers, measures of time, or any other data morsel that can be written in multiple different, but all commonly understood, formats.

In FIG. 7A, is an illustration of an embodiment of an exemplary computer 700 suitable for use with the present invention including display 703 having display screen 705. Cabinet 707 houses standard computer components (not shown) such as a disk drive, CDROM drive, display adapter, network card, random access memory (RAM), central processing unit (CPU), and other components, subsystems and devices. User input devices such as a mouse 711 having buttons 713, and keyboard 709 are shown.

Other user input devices such as a trackball, touch-screen, digitizing tablet, etc. can be used. In general, the computer 700 is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

FIG. 7B illustrates subsystems that might typically be found in a computer such as computer system 700. In FIG. 7B, subsystems within box 720 are directly interfaced to internal bus 722. Such subsystems typically are contained within the computer system such as within cabinet 707 of FIG. 7A. Subsystems include input/output (I/O) controller 724, System Random Access Memory 9RAM) 726, Central Processing Unit (CPU) 728, Display Adapter 730, Serial Port 740, Fixed Disk 742 and Network Interface Adapter 744. The use of bus 722 allows each of the subsystems to transfer data among the subsystems and, most importantly, with the CPU. External devices can communicate with the CPU or other subsystems via the bus 722 by interfacing with a subsystem on the bus. Monitor 746 connects to the bus through Display Adapter 730. A relative pointing device (RPD) 748 such as a mouse connects through Serial Port 740. Some devices such as a Keyboard 750 can communicate with the CPU by direct means without using the main data bus as, for example, via an interrupt controller and associated registers (not shown).

As with the external physical configuration shown in FIG. 7A, many subsystem configurations are possible. FIG. 7B is illustrative of but one suitable configuration. Subsystems, components or devices other than those shown in FIG. 7B can be added. A suitable computer system can be achieved without using all of the subsystems shown in FIG. 7B. For example, a standalone computer need not be coupled to a network so Network Interface 744 would not be required. Other subsystems such as a CDROM drive, graphics accelerator, etc. can be included in the configuration without affecting the performance of the system of the present invention.

Figure 7C:
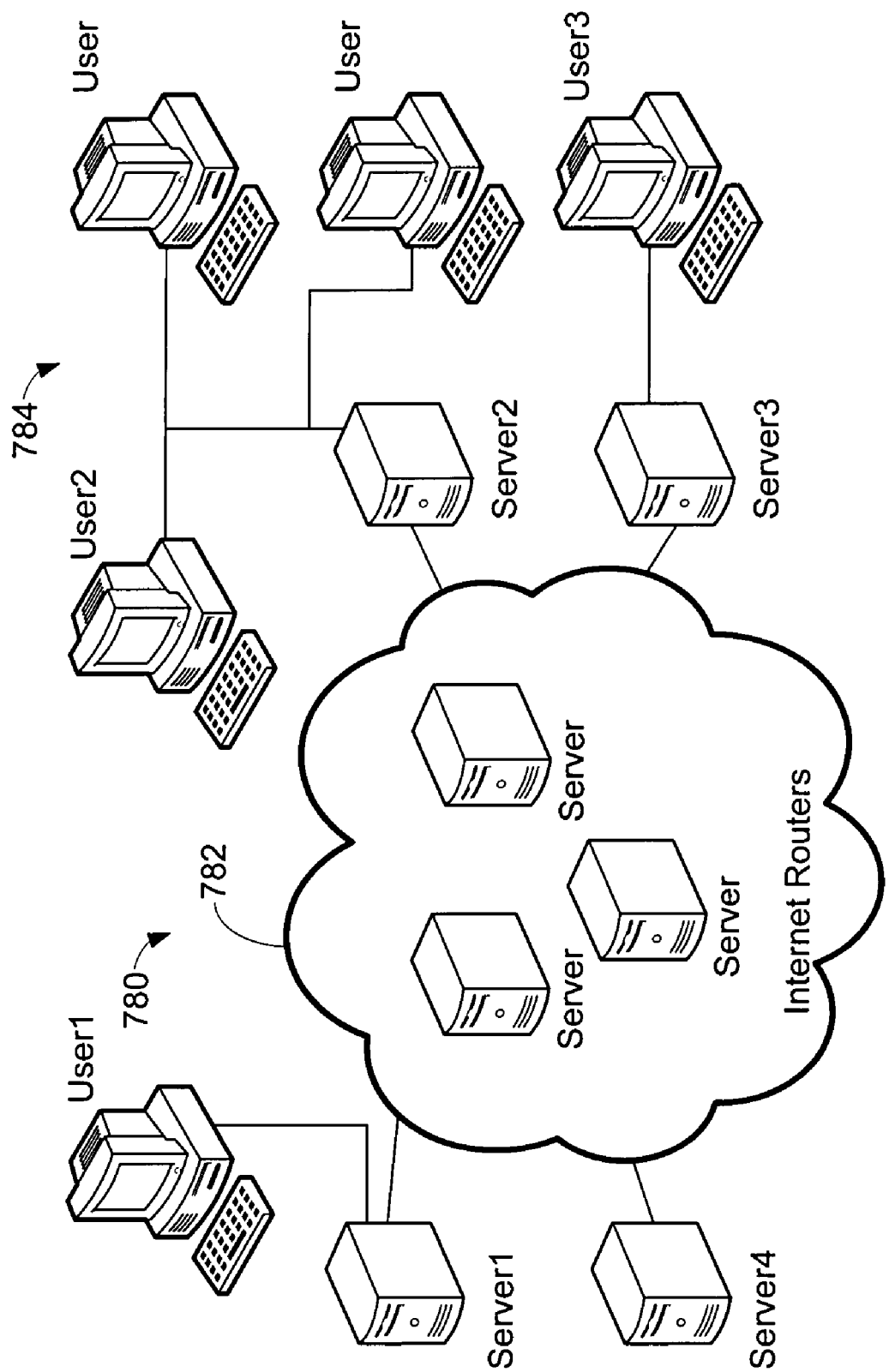
FIG. 7C is a generalized diagram of a typical networked computer system suitable for use with the present invention.

FIG. 7C is a generalized diagram of a typical network. In FIG. 7C, the network system 780 includes several local networks coupled to the Internet. Although specific network protocols, physical layers, topologies, and other network properties are presented herein, embodiments of the present invention are suitable for use with any network.

In FIG. 7C, computer USER1 is connected to Server1. This connection can be by a network such as Ethernet, Asynchronous Transfer Mode, EEE standard 1553 bus, modem connection, Universal Serial Bus, etc. The communication link need not be wire but can be infrared, radio wave transmission, etc. Server1 is coupled to the Internet. The Internet is shown symbolically as a collection of sever routers 782. Note that the use of the Internet for distribution or communication of information is not strictly necessary to practice the present invention but is merely used to illustrate embodiments, above. Further, the use of server computers and the designation of server and client machines are not critical to an implementation of the present invention. USER1 Computer can be connected directly to the Internet. Server1's connection to the Internet is typically by a relatively high bandwidth transmission medium such as a T1 or T3 line.

Similarly, other computers at 784 are shown utilizing a local network at a different location from USER1 computer. The computers at 784 are couple to the Internet via Server2. USER3 and Server3 represent yet a third installation.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically though of as client machines because they are primarily used to obtain information from the Internet for a user operating the machine. Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer system" for purposes of embodiments of the present invention may include a single computer, a local area network (LAN), a wide area network (WAN), and the like. A "computer" for purposes of embodiments of the present invention may include any processor-containing device, such as a mainframe computer, personal computer, laptop, notebook, microcomputer, server, personal digital assistant or "PDA," personal data manager or "PIM" (also referred to as a personal information manager or "PIM") smart cellular or other phone, so-called smart card, set-top box, or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" or "computer-readable media" for purposes of embodiments of the present invention may be any tangible medium/media that can contain, store, the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, or computer memory. The computer readable medium may have suitable instructions for synchronously presenting multiple video program ID streams, such as on a display screen, or for providing for input or presenting in accordance with various embodiments of the present invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claim.

What is claimed is:

1. A method for using a computer system to interpret data, the computer system including a display screen, wherein the computer system controls a user interface presented to the display screen, the method comprising:

accepting the data from a data entry field of the user interface, wherein the data is provided to the data entry field in a selected format, and wherein the selected format is different from a common data format expected by the user interface;

normalizing the accepted data to conform to the common data format expected by the user interface, wherein normalizing is based on information about one or more of a geographic location of the user, a geographic location of a computer associated with the computer system, and a geographic location of a product being used, wherein normalizing the data further includes, identifying a type associated with the data entry field as a universal product code (UPC) number, converting the data into a raw data string using conversion rules associated with the type, the raw data string being a raw UPC number string, and validating the raw data string using validation rules associated with the type, wherein validating the raw data string further includes, determining a length of the raw UPC number string, comparing the length of the raw UPC number string to a pre-determined constant value, displaying an error message from the user interface if the length of the raw UPC number string is different from the pre-determined constant value, and determining whether the raw UPC number string is a valid UPC number if the length of the raw UPC number string is equal to the pre-determined constant value, wherein determining whether the raw UPC number string is valid further includes, calculating a first sum equal to a sum of all odd position numeric characters in the raw UPC number string, calculating a product equal to three times the sum of all the odd position numeric characters, calculating a second sum equal to a sum of all even position numeric characters in the raw UPC number string, calculating a third sum equal to the first sum plus the product, calculating a next highest multiple of ten of the third sum, and calculating a difference equal to the third sum minus the next highest multiple of ten of the third sum; and providing the normalized data in the common data format.

2. The method as recited in claim 1, wherein normalizing the data to conform to the common data format is further based on information about a user of the computer system.

3. The method as recited in claim 1, wherein providing the data in the common data format includes one of:

formatting the raw universal product code (UPC) number string according to the common data format, if the difference is equal to a last numeric character of the raw universal product code (UPC) number string; and displaying an error message from the user interface, if the difference is different from the last numeric character of the raw universal product code (UPC) number string.

4. The method as recited in claim 3, wherein formatting the raw universal product code (UPC) number string includes:

displaying manufacturer information associated with the universal product code (UPC) number represented by the raw universal product code (UPC) number string.

5. The method as recited in claim 1, wherein determining whether the raw UPC number string is valid further includes:

determining that the raw UPC number string is valid when the difference is equal to a last digit of the UPC raw UPC number string.

6. A computer-readable medium for directing a computer system to interpret data, the computer system including a display screen, wherein the computer system controls a user interface presented to the display screen, the computer-readable medium comprising:

instructions for accepting the data from a data entry field of the user interface, wherein the data is input to the data entry field in a user selected format, and wherein the user selected format is different from a common data format recognized by the user interface;

instructions for normalizing the accepted data to conform to the common data format expected by the user interface, wherein normalizing is based on information about one or more of a geographic location of the user, a geographic location of a computer associated with the computer system, and a geographic location of a product being used, wherein normalizing the data further includes, identifying a type associated with the data entry field as a universal product code (UPC) number, converting the data into a raw UPC number string using conversion rules associated with the type, and validating the raw UPC number string using validation rules associated with the type, wherein validating the raw UPC number string further includes determining that the raw UPC number string is a valid UPC number if a length of the raw UPC number string is equal to a pre-determined constant value, wherein determining whether the raw UPC number string further includes, calculating a first sum equal to a sum of all odd position numeric characters in the raw UPC number string, calculating a product equal to three times the sum of all the odd position numeric characters, calculating a second sum equal to a sum of all even position numeric characters in the raw UPC number string, calculating a third sum equal to the first sum plus the product, calculating a next highest multiple of ten of the third sum, and calculating a difference equal to the third sum minus the next highest multiple of ten of the third sum; and instructions for providing the normalized data in the common data format.

* * * * *